United States Patent [19]

Richards et al.

[11] Patent Number: 4,487,193

[45] Date of Patent: Dec. 11, 1984

[54] THERMALLY OPERATED PROPELLER ASSEMBLY

[76] Inventors: Terry E. Richards; Janet A. Richards, both of 56467 N. Bank Rd., McKenzie Bridge, Oreg. 97401

[21] Appl. No.: 543,472

[22] Filed: Oct. 19, 1983

[51] Int. Cl.$^3$ .............................................. F24C 1/00
[52] U.S. Cl. ....................................... 126/58; 446/57; 374/135; 374/187; 116/216; 416/128; D21/93
[58] Field of Search .............. 126/58, 80, 312, 285 R, 126/295, 289; 374/135, 187; 116/216; 98/40 R; 416/128; D21/93; 46/57; 244/153 A, 1 R; D23/151, 158, 165

[56] References Cited

U.S. PATENT DOCUMENTS

| | | | |
|---|---|---|---|
| 137,406 | 4/1873 | Belknap | 46/57 |
| D. 268,053 | 2/1983 | Kozlowski | 46/57 |
| 549,897 | 11/1895 | Carroll | 46/57 |
| 671,181 | 4/1901 | Cardella | 46/57 |
| 994,057 | 5/1911 | Claycomb | 126/312 |
| 2,235,461 | 3/1941 | Miller | 46/57 |

*Primary Examiner*—James C. Yeung
*Attorney, Agent, or Firm*—Harvey B. Jacobson

[57] ABSTRACT

A temperature indicating propeller assembly comprises first and second propellers freely suspended one above the other on a common suspension wire for rotation by rising air currents. One propeller is of larger diameter than the other so that it commences rotation by air currents generated at lower temperatures than the other propeller. The assembly can be suspended over a domestic stove, for example, to indicate when the stove is operating at normal temperature by rotation of the one propeller, or when the stove is operating at an excessive temperature by rotation of both propellers.

11 Claims, 5 Drawing Figures

THERMALLY OPERATED PROPELLER ASSEMBLY

BACKGROUND OF THE INVENTION

A propeller of suitable design, when freely suspended for rotation about a vertical axis, can be operated by rising air currents generated, for example, by a heat source under the propeller. Generation of sufficient force to rotate such a propeller is dependent both on the configuration and size of the propeller and on the strength of the rising air currents, which in itself is dependent on the temperature of the heat source in relation to the surrounding atmosphere. Thus, freely suspended propellers can be used as temperature indicators since, for example, rotation of a particular propeller suspended above a particular heat source, such as a domestic stove, will only commence when the rising air currents from the stove are of a particular strength dependent on the stove attaining a particular temperature. Accordingly, rotation of the propeller is indicative of the source having attained a particular temperature. The present invention utilizes this principle to provide an improved temperature indicating device.

STATEMENT OF PRIOR ART

Acknowledgement is made of the following U.S. patent specifications pertaining to the general field of the invention, but not disclosing the principles thereof.
U.S. Pat. No. 799,603
U.S. Pat. No. 1,484,934
U.S. Pat. No. 3,124,087

SUMMARY OF THE INVENTION

The invention provides a temperature indicating propeller assembly comprising first and second freely suspended propellers each adapted to be rotated by rising air currents, but having different rotational characteristics, so that when both are suspended above a heat source, one of the propellers requires a force to commence rotation generated by rising air currents produced when the source attains a particular temperature, and the other propeller requires a greater force to commence rotation generated by rising air currents produced when the source attains a temperature higher than said particular temperature.

An assembly according to the invention may, for example, comprise first and second propellers freely suspended one above the other on a common suspension wire or the like, one propeller being of larger diameter than the other, so that when the assembly is suspended above a heat source, such as a domestic stove, the one propeller will commence rotating at a lower heat source temperature than the other propeller, whereby, in the case of a stove, the assembly can be used, for example, to indicate when the stove is working at a normal operating temperature by rotation of the one propeller, or at an excessive temperature by rotation of both propellers.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF PREFERRED EMBODIMENT

A propeller assembly 10 in accordance with the invention comprises a length of wire 12 or like suspension means, on which are suspended, one below the other, a pair of freely rotatable propellers 14 and 16, the propellers for example, being located in spaced relation by beads 18 or the like crimped on the wire.

Figure 5:
FIG. 5 is a sectional view on line 5—5 of FIG. 3.

Propeller 14 may, for example, comprise four orthogonally disposed blades 20 of light-weight metal sheet or plastic, the blades being integrated or being manufactured separately and attached together, and the blade profiles being so oriented (see FIG. 5) that when freely suspended above a heat source, such as a domestic stove 22, propeller 14 will rotate in a clockwise direction when the rising air currents produced by the source are of a particular strength attained when the heat source is at a particular temperature.

Figure 1:
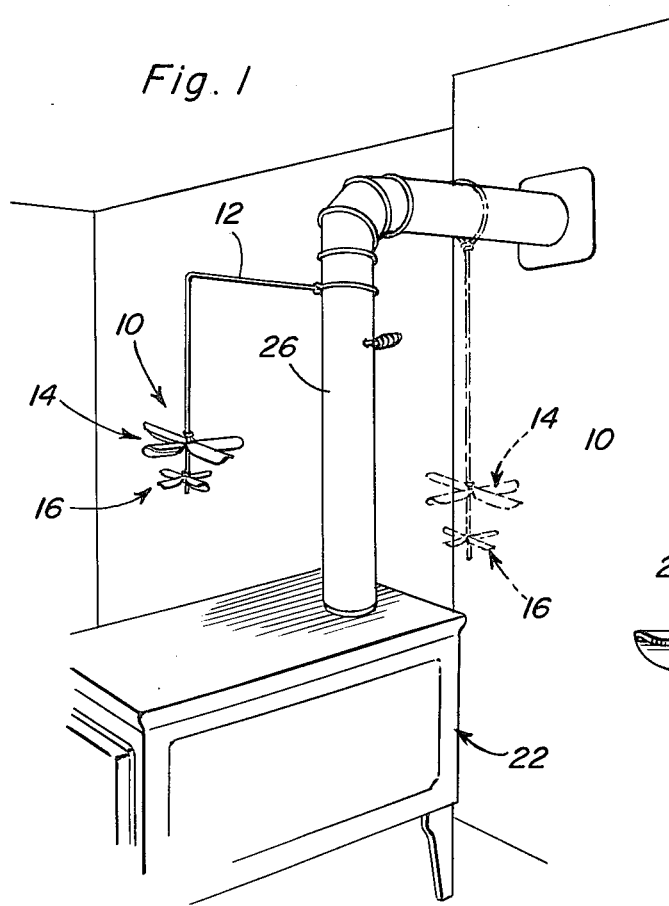
FIG. 1 is a perspective view of a domestic stove equipped with a temperature indicating propeller assembly in accordance with the invention.
Figure 2:
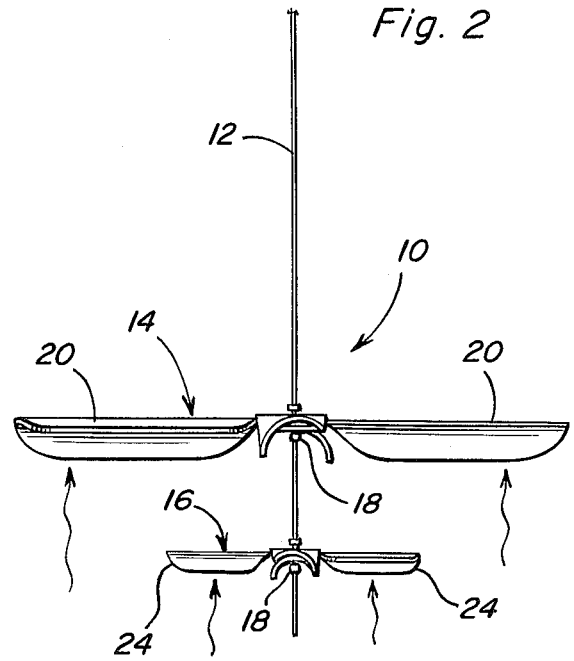
FIG. 2 is an elevational view of the propeller assembly.
Figure 3:
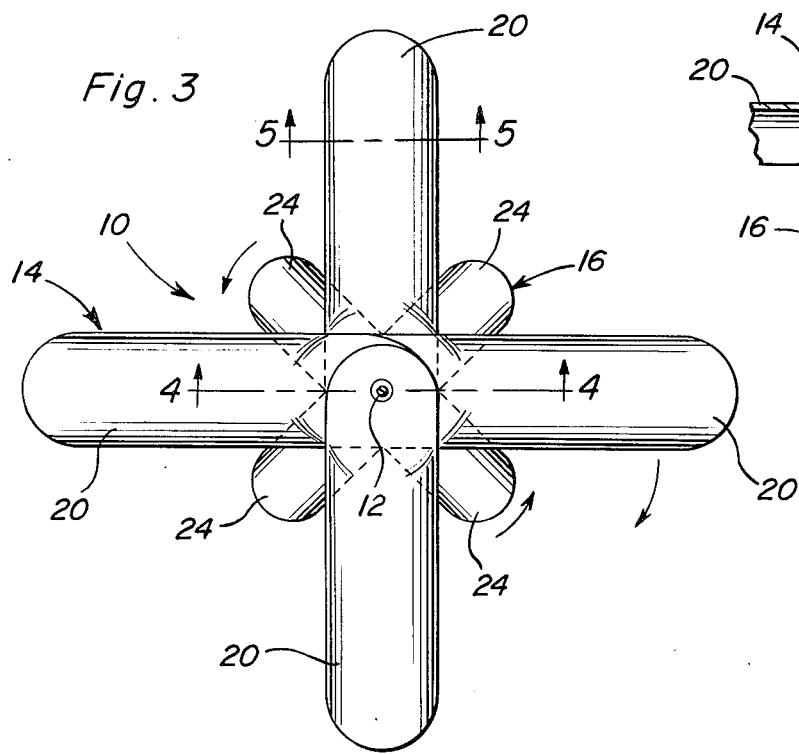
FIG. 3 is a plan view of the assembly.
Figure 4:
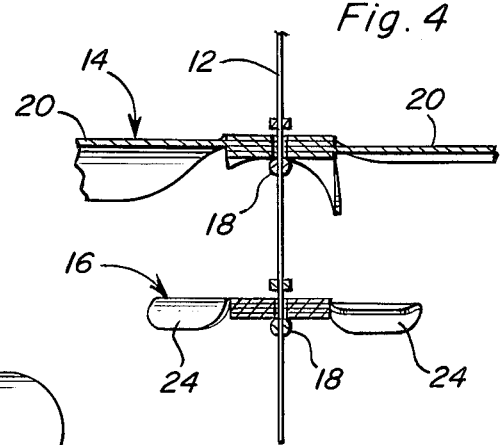
FIG. 4 is a sectional view on line 4—4 of FIG. 3.

Propeller 16 may also comprise four orthogonally disposed blades 24 of similar construction but smaller diameter than blades 20, and blades 24 may be oriented to rotate in a counterclockwise direction when suspended in a suitable rising air current. Because blades 24 are of smaller diameter than blades 20, they will only commence rotation in a stronger rising air current than blades 20, so that propeller 16 will only commence rotation when the heat source attains a temperature which is higher than the temperature at which propeller 14 commences rotation. Accordingly, the assembly can be suspended above a domestic stove 22 as shown in FIG. 1, for example by hooking wire 12 around the flue pipe 26 of the stove, either in the full line position or in the dotted line position of the assembly, and the assembly may be used as an indicator that the stove is operating at normal temperature by rotation of propeller 14 only, or that the stove is operating above normal temperature (at an excessive temperature) by rotation of both propellers 14 and 16. This is useful to a householder who may simply view the propeller assembly in order to determine the stove operating temperature rather than having to go to the stove and test its temperature by other means.

For application as a stove temperature indicator, the diameter of propeller 14 may be about nine inches, and the diameter of propeller 16 may be about four inches.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:
1. A propeller assembly for indicating when a stove operates at a normal temperature and at an excessive temperature comprising first and second propellers, suspension means for suspending the propellers so that each propeller can be rotated by rising air currents, the propellers having different rotational characteristics so that when suspended above a stove one of the propellers requires a force to commence rotation generated by rising air currents produced when the stove attains the normal temperature, and the other propeller requires a greater force to commence rotation generated by rising air currents produced when the stove attains the excessive temperature.

2. The invention of claim 1 wherein said one propeller is of greater diameter than the other propeller.

3. The invention of claim 1 wherein the suspension means comprises a common elongate member for mounting both of the propellers in vertically spaced relation.

4. The invention of claim 3 wherein said one propeller is of larger diameter than the other propeller.

5. The invention of claim 4 wherein the one propeller is mounted on the suspension means above the other propeller.

6. The invention of claim 1 wherein each propeller comprises four orthogonally disposed blades.

7. The invention of claim 1 wherein the one propeller comprises blades oriented for rotation of the one propeller in a clockwise direction and the other propeller comprises blades oriented for rotation of the propeller in a counterclockwise direction.

8. A temperature indicating propeller assembly comprising first and second propellers freely suspended one above the other on a common suspension wire or the like for rotation by rising air currents, one propeller being of larger diameter than the other so that when the assembly is suspended over a heat source, the one propeller will commence rotating at a predetermined lower heat source temperature than the other propeller, whereby the assembly may be used to indicate when the source is at a first specified temperature by rotation of the one propeller, and when the source is at a second higher specified temperature by rotation of both propellers.

9. The invention of claim 8 wherein the assembly is suspended above a domestic stove to indicate when the stove is operating at a normal temperature by rotation of the one propeller, or at an excessive temperature by rotation of both propellers.

10. The invention of claim 9 wherein the common suspension wire or the like is hooked around a flue pipe of the stove.

11. The invention of claim 8 wherein one of the propellers is adapted to rotate in a clockwise direction and the other propeller is adapted to rotate in a counterclockwise direction.

* * * * *